(No Model.) 3 Sheets—Sheet 1.
G. W. M. SHEARER.
POTATO DIGGER.
No. 573,798. Patented Dec. 22, 1896.
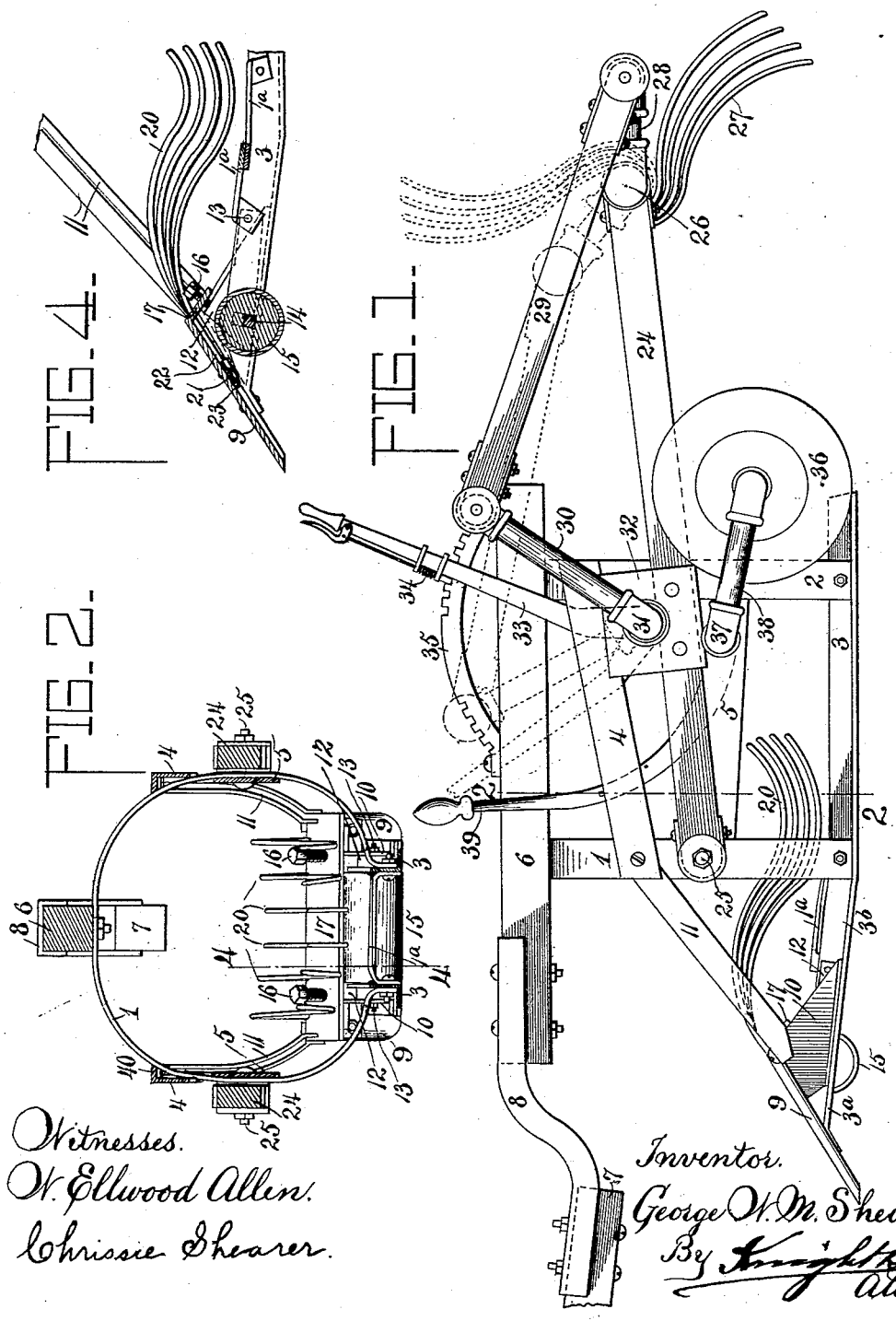
Witnesses.
W. Ellwood Allen.
Chrissie Shearer.
Inventor.
George W. M. Shearer.
By Knight Bros
Attys.

(No Model.)  G. W. M. SHEARER.  3 Sheets—Sheet 2.
POTATO DIGGER.
No. 573,798.  Patented Dec. 22, 1896.
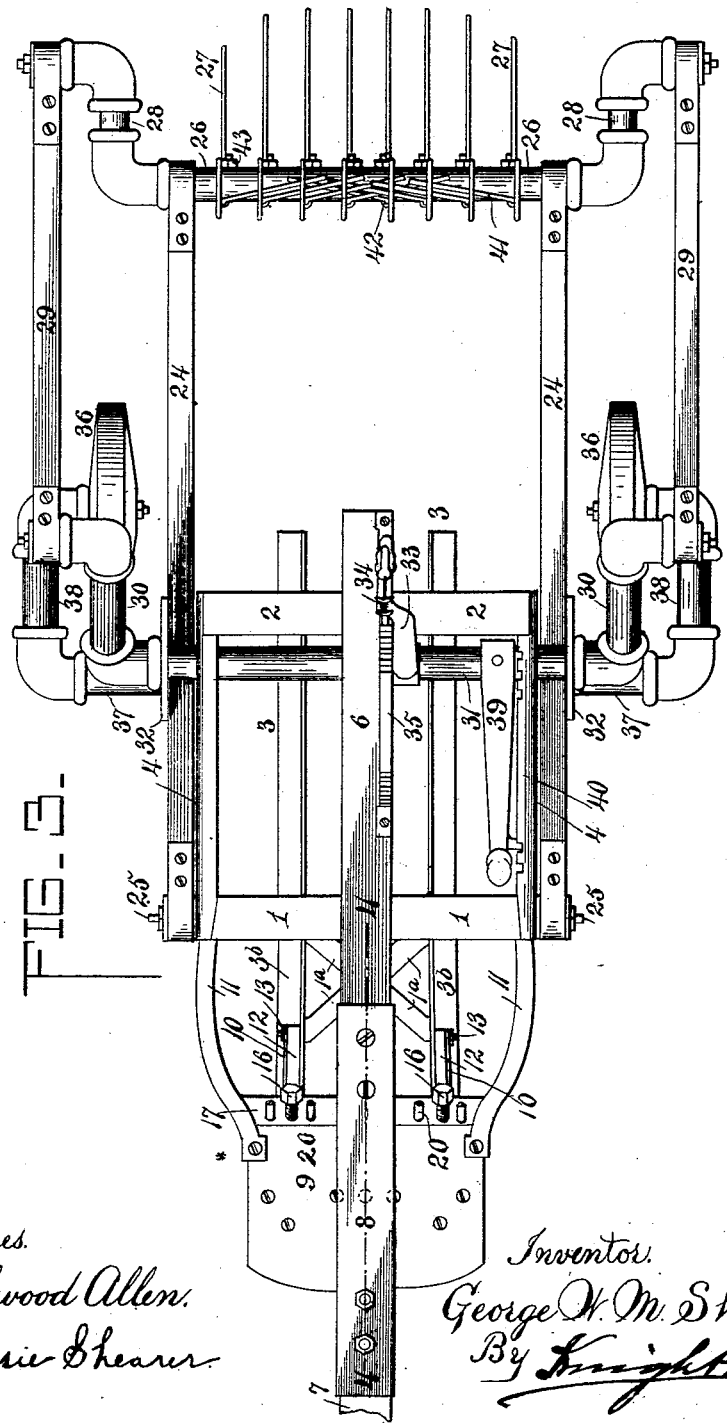
Witnesses.
W. Ellwood Allen.
Chrissie Shearer.
Inventor.
George W. M. Shearer.
By Knight Bros.
Attys.

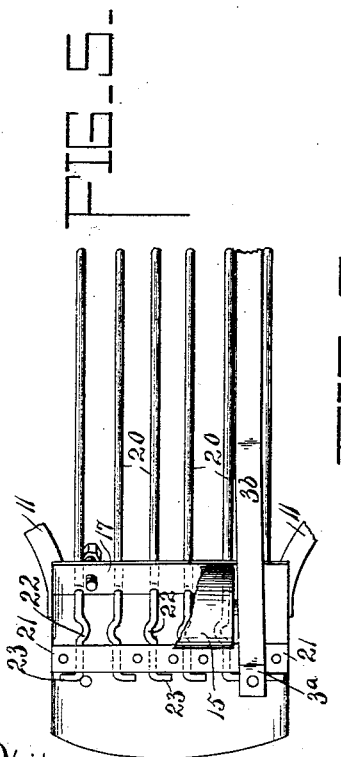

UNITED STATES PATENT OFFICE.

GEORGE W. M. SHEARER, OF JACKSON, MICHIGAN.

POTATO-DIGGER.

SPECIFICATION forming part of Letters Patent No. 573,798, dated December 22, 1896.

Application filed March 4, 1896. Serial No. 581,824. (No model.)

*To all whom it may concern:*

Be it known that I, GEORGE W. M. SHEARER, a citizen of the United States, and a resident of Jackson, in the county of Jackson and State of Michigan, have invented certain new and useful Improvements in Potato-Diggers, of which the following is a specification.

My invention has for its objects to excavate the soil containing the potatoes, pass the same rearward over a riddle, where the dirt is thoroughly separated from the potatoes and the latter deposited upon the top of the ground, and to rake the potatoes up into piles confined to the row being worked, the vines being also raked up and left in piles, so as to make it very convenient to remove the latter if the ground is to be used for another crop.

In carrying out my invention I employ a flat shovel-plow set at a low angle so that it penetrates the soil to the bottom of the row in which the potatoes are grown and by the forward movement of the implement causes the soil containing the potatoes to pass rearward through the machine, the plow being mounted upon a frame comprising a pair of ribs supported on runners, a roller being mounted with each plow, so as to regulate the depth of penetration, and a riddle being employed which consists of rods secured at their forward ends beneath the plow and having their free ends bent and extending rearwardly, so as to form a dished series upon which the dirt and potatoes may be delivered and the former sifted out from the latter, which are dumped on top of the ground over the row from which they have been taken. I also employ a rake comprising teeth set so that those on the ends are slightly in advance of those toward the middle, to cause the potatoes to be assembled in a pile instead of being scattered, and these teeth are secured to a shaft which is mounted in the rear ends of a pair of arms secured at their forward ends to the frame of the machine, the shaft of the rake being connected through the medium of cranks and pitmen with relatively longer cranks upon a controlling-shaft, which is journaled in the frame and provided with an operating-lever, so that the rake, for purpose of dumping, may be made to make a complete revolution backward. Finally, I also provide the machine with a pair of wheels having their journals fixed in the ends of cranks or offsets upon the ends of a shaft which carries a controlling-lever adapted to project the wheels downward when the implement is to be turned or transported for use and thus prevent contact of the plow with the ground.

My invention consists in certain novel features and details of construction hereinafter particularly pointed out in the claims, and which will now be fully described with reference to the accompanying drawings, in which—

Figure 1 is a side elevation of the implement with the parts shown in the positions which they occupy in operation, the dumping action of the rake being indicated by dotted lines. Fig. 2 is a vertical transverse section on the line 2 2 of Fig. 1. Fig. 3 is a plan of the machine. Fig. 4 is a vertical longitudinal section of the plow, taken on the line 4 4, Figs. 2 and 3. Fig. 5 is a detail view of the under side of the plow, showing the attachment of the riddle-bars and also showing a fragment of the roller. Fig. 6 is a view similar to Fig. 1, but showing the parts in the position which they occupy in the act of turning the implement, if desired, or more especially when the implement is being transported.

The implement comprises a pair of bow-frames 1 2, open substantially as shown in Fig. 2, supported at bottom upon runners 3 by crossed bars 1$^a$ and provided with side braces 4 5 and having a draft-beam 6, to which may be attached a tongue 7 through the medium of a coupling 8. To the forward ends of the runners and through the medium of their bottom flanges 3$^a$ is secured a flat shovel-plow or scoop 9, which may be braced by angle-plates 10, secured to the plow and to the runners, and the plow may be further braced by diagonal bars 11. The forward ends 3$^b$ are preferably upturned slightly beyond the frame 1, and upon these upturned portions are secured bearing-pieces 12, (see Fig. 4,) which are pivoted at 13 to the runners 3 and afford bearings for the trunnions which extend through slots in the runners 14 of a roller 15, which regulates the depth of penetration of the plow 9. In order to adjust the bearing-pieces 12, screws 16 pass through a downturned portion 17 at the rear edge of the plow and bear against the bearing-pieces 12, so as to hold the roller down to any desired extent. This downturned portion 17 serves another important function, inasmuch as it, together with the angle-plates 10, incloses the roller 15 with its bearings and protects it from the dirt.

20 represents curved bars forming a dished or hollow riddle upon which the potatoes are delivered with the dirt to be separated therefrom, and these bars pass through openings in the downturned portion 17 of the plow and are secured on the under side of the latter, as shown in Fig. 5, by means of clamping-plate 21, said bars having bends 22 23 to prevent their turning. These bars form a vibratory riddle which effectively separates the dirt from the potatoes and deposits the latter upon the ground.

In order to gather the potatoes in piles, a pair of arms 24 are pivoted at 25 upon the frame 1, and at their rear ends they have mountings for a rake-shaft 26, provided with teeth 27 and having cranks 28, which are connected by pitmen 29 to relatively longer crank-arms 30 on a shaft 31, mounted in plates 32, secured at intermediate points on the arms 24. An operating-lever 33, having a dog 34 engaging in a segmental rack 35 on the beam 6, makes it possible to move the shaft 31 at will to rotate the rake backward for dumping, the rake being held normally with the cranks 28 and the cranks 30 in position to make the line of pull beyond the dead-center, as shown in Fig. 1, and the parts being such that upon being moved to the position shown in dotted lines in said figure gravity will cause the rake to complete the revolution upon the return of the handle.

For convenience in transporting the implement or for reversing it at the end of a row I provide a pair of wheels 36, mounted upon an axle 37, which has crank-bends 38, at the ends of which are formed the spindles for the wheels 36, while a controlling-lever 39 on the axle 37 adapts said axle to be turned until the wheels 36 are forced down and the implement raised from the ground and the desired result accomplished. In Fig. 3 will be seen a rack 40, into which the lever 39 may be forced for the purpose of fixing it at any adjustment.

In making the rake I prefer to coil the teeth 27 around the shaft 26 and then bend their ends 41 in a direction approximately longitudinal to the shaft and secure the teeth to the shaft by means of clamps 42, which engage the teeth and which pass diametrically through the shaft to be held by nuts 43 on the other side.

A machine constructed as above described, in addition to having the advantages of removing the potatoes from the ground and completely separating them from the dirt, collects the potatoes in piles confined within the row which is being operated upon and leaving each row unobstructed, so that it may be harvested in turn. The machine is adapted to be drawn by a single pair of horses.

Having thus described my invention, the following is what I claim as new therein and desire to secure by Letters Patent:

1. A root-digger comprising a suitable frame, having a pair of runners by which it is supported in the furrow, a shovel-plow mounted at a low angle on the runners, a cylindrical roller mounted on the runners beneath the shovel-plow, and the vibrating dish-shaped riddle consisting of a series of yielding curvilinear rods secured at their forward ends to the shovel-plow; substantially as described.

2. A root-digger comprising a pair of bow-frames, a pair of runners on which the bow-frames are supported, the side braces, the draft-beam, the coupling, the tongue, a shovel-plow mounted at a low angle on the runners, the diagonal brace-bars, a cylindrical roller mounted on the runners beneath the shovel-plow, and the vibrating dish-shaped riddle consisting of a series of yielding curvilinear rods secured at their forward ends to the shovel-plow; substantially as described.

3. In a potato-digger, the combination of the runners, the bearing-pieces adjustably mounted upon the forward ends of the runners, a cylindrical roller trunnioned in said bearing-pieces, the shovel-plow secured to the runners over the roller and having the downturned edge, and the adjusting-screws working through the downturned edge and bearing against the bearing-pieces, as explained.

4. In a potato-digger, the combination of a suitable frame carrying means for excavating the ground containing potatoes, and separating them from the ground, and a rake for gathering the potatoes, provided with means for reversing it rearward consisting of a crank on the rake-shaft, a relatively longer crank on a controlling-shaft, a pitman connecting the cranks together, and an operating-lever on the controlling-shaft substantially as set forth.

5. The combination of a suitable frame carrying a plow constructed to dig up potatoes and deliver them to the rear, a pair of rearwardly-extending arms secured at their forward ends on the frame and having intermediate supports, a rake supported in a crank-shaft journaled in the rear ends of said rods, a controlling-shaft journaled in plates mounted upon intermediate points of the rearwardly-extending arms and having cranks longer relatively than the cranks on the rake-shaft and connected by pitmen to the latter, an operating-lever secured to the controlling-shaft, and a ratchet for holding said lever substantially as set forth.

6. A root-digger comprising a suitable frame having a pair of runners by which it is supported in the furrow, a shovel-plow mounted at a low angle on the runners, a cylindrical roller mounted on the runners beneath the shovel-plow, the vibrating dish-shaped riddle consisting of a series of yielding curvilinear rods secured at their forward ends to the shovel-plow, the shaft having crank-arms, the wheels mounted on the crank-arms and normally out of contact with the ground, and means for turning the shaft for supporting the frame on the wheels; substantially as described.

7. A root-digger comprising a suitable frame, a pair of side arms pivoted to the forward part of the frame and extending rearwardly, a rake-shaft having crank-arms and provided with yielding teeth coiled thereon and mounted on the rear part of the side arms, the operating-shaft having crank-arms and mounted on the side arms near the rear part of the frame, the pitmen connecting the crank-arm of the shafts, and means for turning the operating-shaft; substantially as described.

GEORGE W. M. SHEARER.

Witnesses:
FIDUS LIVERMORE,
W. R. BROWN.